United States Patent
Ha et al.

(10) Patent No.: US 9,869,746 B2
(45) Date of Patent: Jan. 16, 2018

(54) METHOD FOR ESTIMATING ANGLE OF ARRIVAL OF MULTI-TARGET MOVING AT HIGH SPEED

(71) Applicant: AGENCY FOR DEFENSE DEVELOPMENT, Daejeon (KR)

(72) Inventors: Jae-Hyoun Ha, Seosan-si (KR); Woong Park, Taean-gun (KR); Sang-Min Kim, Taean-gun (KR); Yong-Jae Lee, Seosan-si (KR)

(73) Assignee: AGNECY FOR DEFENCE DEVELOPMENT, Daejeon (KR)

( * ) Notice: Subject to any disclaimer, the term of this patent is extended or adjusted under 35 U.S.C. 154(b) by 548 days.

(21) Appl. No.: 14/549,767

(22) Filed: Nov. 21, 2014

(65) Prior Publication Data

US 2015/0362580 A1    Dec. 17, 2015

(30) Foreign Application Priority Data

Jun. 11, 2014    (KR) .......................... 10-2014-0070776

(51) Int. Cl.
   *G01S 5/02*    (2010.01)
   *G01S 3/74*    (2006.01)

(52) U.S. Cl.
   CPC ..................... *G01S 3/74* (2013.01)

(58) Field of Classification Search
   CPC ..................... G01S 5/02; G01S 3/74
   USPC .......................................... 342/417
   See application file for complete search history.

(56) References Cited

U.S. PATENT DOCUMENTS

| 7,268,728 B1 * | 9/2007 | Struckman | ............... | G01S 5/04 342/424 |
| 7,535,420 B2 * | 5/2009 | Grabbe | ................ | G01S 5/0294 342/451 |
| 7,804,445 B1 * | 9/2010 | Fiore | ........................ | G01S 3/74 342/146 |

(Continued)

FOREIGN PATENT DOCUMENTS

| JP | EP 1215507 A2 * | 6/2002 | ............... | G01S 3/74 |
| KR | 10-0912251 B1 | 8/2009 | | |

OTHER PUBLICATIONS

Jae-Hyoun Ha et al., "A Study on Direction Finding Method for Rapidly Moving Wide-band Source," Korean Society for Noise and Vibration Engineering, vol. 25, No. 10, pp. 249-250, Oct. 2013, South Korea.

*Primary Examiner* — Harry Liu
(74) *Attorney, Agent, or Firm* — LRK Patent Law Firm

(57) ABSTRACT

A method for estimating an angle of arrival of multiple targets moving at a high speed includes defining a range and a resolving power of an angle of arrival and an angular velocity of a plurality of direction finding targets (S1100), setting minimum values of the angle of arrival and the angular velocity within the range to be a set angle of arrival and a set angular velocity (S1200), and adding angle of arrival resolution and angular velocity resolution to the set angle of arrival and the set angular velocity, respectively, deriving a two-dimensional spatial spectrum of a transformed incident signal using a pre-steered vector until the angle of arrival and the angular velocity become a maximum value, and estimating a peak value of the spatial spectrum as a measured angle of arrival and a measured angular velocity of the target (S1300).

14 Claims, 10 Drawing Sheets

(56) References Cited

U.S. PATENT DOCUMENTS

2001/0049295 A1\* 12/2001 Matsuoka .............. H04B 7/086
 455/562.1
2007/0052580 A1\* 3/2007 Fiore .................... G01S 13/449
 342/133

\* cited by examiner

METHOD FOR ESTIMATING ANGLE OF ARRIVAL OF MULTI-TARGET MOVING AT HIGH SPEED

CROSS-REFERENCE TO RELATED APPLICATIONS

This application claims priority to Korean Patent Application No. 10-2014-0070776, filed on Jun. 11, 2014, which is incorporated herein by reference in its entirety.

TECHNICAL FIELD

Exemplary embodiments of the present invention relate to a method for estimating an angle of arrival of multiple targets moving at a high speed, and more particularly, to a method for estimating an angle of arrival of multiple targets moving at a high speed which is a signal processing algorithm for estimating an angle of arrival of multiple targets using, electromagnetic waves or sound waves radiated from targets acquired by array sensors.

BACKGROUND

Most of the conventional array signal processing technologies are based on the assumption that targets are stationary. When the angle of arrival of targets actually moving is estimated by the technologies, performance deterioration occurs, and in particular, desired information on targets moving at a high speed may not be estimated due to a dispersion effect of the angle of arrival for an observation time.

To solve the above problem, as a method for positioning multiple targets moving at a high speed, a local polynomial approximation beamforming (LPA beamforming) method has been introduced. The LPA beamforming method is a method for simultaneously estimating an angle of arrival and an angular velocity by approximating a motion model of a target using an angle of arrival and an angular velocity and performing two-dimensional finding with the same resolution as a conventional beamformer (traditional beamforming method).

The method may also divide targets moving at different angular velocities at the same angle of arrival by estimating both of the angle of arrival and the angular velocity of the multi-target. However, the LPA beamforming method has the same resolution as the conventional beamformer and therefore may hardly differentiate closely moving targets.

SUMMARY

An embodiment of the present invention is directed to a method for estimating an angle of arrival of multiple targets moving at a high speed which is an array signal processing algorithm for estimating an angle of arrival of multiple targets, moving at a high speed with high resolution.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for estimating an angle of arrival of multiple targets moving at a high speed includes: defining a range and a resolving power of an angle of arrival and an angular velocity of a plurality of direction finding targets; setting minimum values of the angle of arrival and the angular velocity within the range to be a set angle of arrival and a set angular velocity; and adding angle of arrival resolution and angular velocity resolution to the set angle of arrival and the set angular velocity, respectively, deriving a two-dimensional spectrum of a transformed incident signal using a pre-steered vector until the angle of arrival and the angular velocity become a maximum value, and estimating, a peak value of the two-dimensional spectrum as a measured angle of arrival and a measured angular velocity of the target.

In the estimating, the pre-steered vector may be calculated using the set angle of arrival and the set angular velocity and the pre-steered vector may be a matrix which transforms steered vectors for each sample defined by the set angle of arrival and the set angular velocity into a steered vector of a signal incident, at 0°.

A sample covariance matrix may be calculated from the incident signal, in the estimating, the two-dimensional spectrum may be derived by calculating a multiple signal classification (MUSIC: high-resolution subspace direction finding method) power spectrum for the set angle of arrival, and the set angular velocity, and prior to calculating the multiple signal classification (MUSIC: high-resolution subspace direction finding method) power spectrum for the set angle of arrival and the set angular velocity, a covariance matrix calculated from the transformed incident signal may be eigen-decomposed.

After the two-dimensional spectrum is derived in the estimating, the determining of the maximum value determining whether the set angle of arrival and the set angular velocity are the maximum value within the range may be performed and if it is determined that both of the set angle of arrival and the set angular velocity are the maximum value within the range, detecting a peak value of the two-dimensional spectrum may be performed.

In accordance with another embodiment of the present invention, a method for estimating an angle of arrival of multiple targets moving at a high speed includes: defining a range and resolving power of an angle of arrival and an angular velocity of a plurality of direction finding targets; setting minimum values of the angular velocity within the range to be the set angular velocity; and adding the angular velocity resolution to the set angular velocity, respectively, deriving a two-dimensional spectrum of a transformed incident signal transformed using a transform vector until the angular velocity become a maximum value, and estimating a peak value of the two-dimensional spectrum as a measured angle of arrival and a measured angular velocity of the target.

The transform vector may be a matrix which transforms a steered vector so that all the incident angles of arrival for the set angular velocity are stationary regardless of a sample and in the estimating, the transform vector may be calculated using the set angle of arrival and the set angular velocity.

In the estimating, a sample covariance matrix may be calculated from the incident signal, in the estimating, the two-dimensional spectrum may be derived by calculating a multiple signal classification (MUSIC: high-resolution subspace direction finding method) power spectrum for the set, angle of arrival and the set angular velocity, prior to calculating the multiple signal classification (MUSIC: high-resolution subspace direction finding method) power spectrum for the set angle of arrival and the set angular velocity, a covariance matrix calculated from the transformed incident signal may be eigen-decomposed, and after the two-dimensional spectrum is derived in the estimating, the determining of the maximum value determining whether the set angular velocity is the maximum value within the range may be performed.

If it is determined that the set angular velocity is the maximum value within the range, detecting a peak value of the two-dimensional spectrum may be performed.

DETAIL DESCRIPTION

Hereinafter, embodiments of the present invention will be described in detail with reference to the accompanying drawings and these embodiments may be implemented in various forms by a person having ordinary skill in the art to which the present invention pertains and therefore the present invention is not limited to the embodiments described herein.

An embodiment of the present invention relates to a direction finding method in which multiple signal classification (MUSIC) which is a high-resolution subspace direction finding method is applied to the conventional local polynomial approximation beamforming method so as to estimate an angle of arrival of multiple targets moving at a high speed with high resolution.

The embodiment of the present invention represents a motion equation for an angle of arrival of a target by an angle and an angular velocity using Taylor approximation as in a local polynomial approximation beamforming method and derives a sample covariance matrix by weighting an appropriate pre-steered vector to an incident signal.

Here, when parameters of an angle and an angular velocity of the pre-steered vector are in accord with parameters of an incident signal, the target is changed as if it is stationary for an observation time and a unique space of the sample covariance matrix forms signal subspaces equal to the number of actual signal sources.

That is, a dispersion effect, due to the motion of the target is not produced and thus a two-dimensional spectrum having a peak value in the corresponding parameters may be confirmed.

Therefore, it is possible to estimate an angle of arrival and an angular velocity with higher resolution by applying the high-resolution subspace direction finding method to the target moving at a high speed, as compared with the conventional local polynomial approximation beamforming method.

Figure 1A:
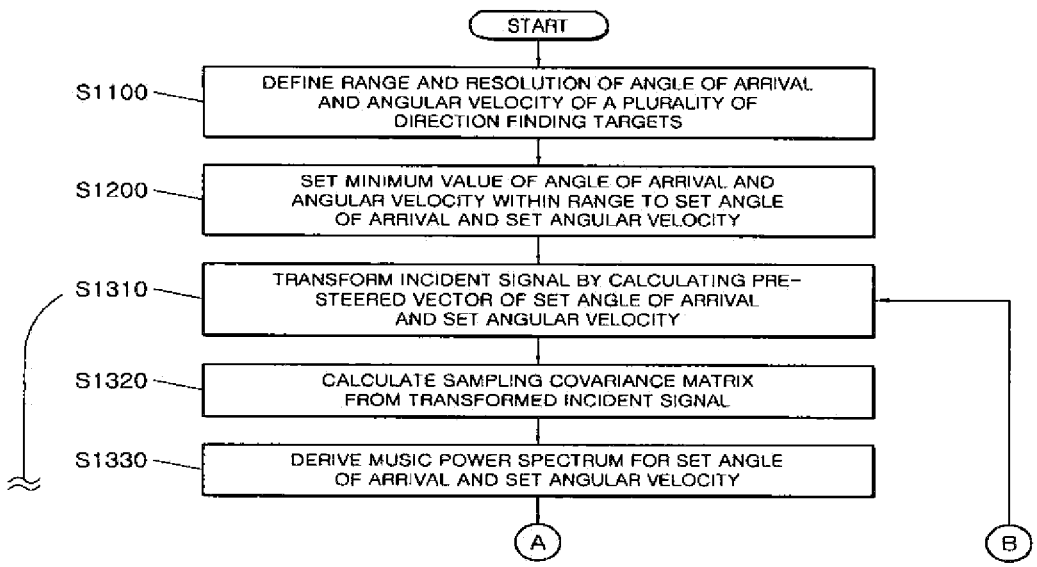
FIGS. 1A and 1B are flow charts of a method for estimating an angle of arrival of multiple targets moving at a high speed in accordance with a first embodiment of the present invention.
Figure 1B:
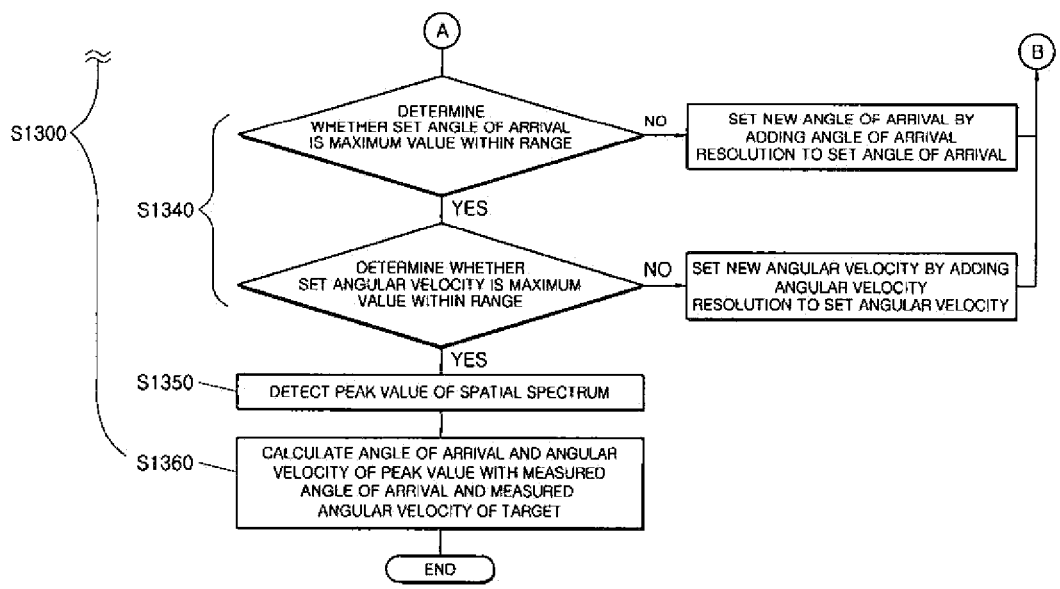

FIGS. 1A and 1B are flow charts of a method for estimating an angle of arrival of multiple targets moving at a high speed in accordance with a first embodiment of the present invention.

As illustrated in FIGS. 1A and 1B, the method for estimating an angle of arrival of multiple targets moving at a high speed in accordance with a first embodiment of the present invention includes: defining a range and a resolving power of an angle of arrival and an angular velocity of a plurality of direction finding targets (S1100); setting minimum values of the angle of arrival and the angular velocity within the range to be a set angle of arrival and a set angular velocity (S1200); and adding angle of arrival resolution and angular velocity resolution to the set angle of arrival and the set angular velocity, respectively, deriving a two-dimensional spectrum of a transformed incident signal using a pre-steered vector until the angle of arrival and the angular velocity become a maximum value, and estimating a peak value of the two-dimensional spectrum as a measured angle of arrival and a measured angular velocity of the target (S1300). Here, the angle of arrival resolution represents capability to decompose angles of arrival, of several signals, which are incident on a plurality of multi-paths, from each other and the angular velocity resolution represents a minimum size unit within a measurement range of angular velocity.

In the defining (S1100), a range of the angle of arrival to be found is set from predicted angles of arrival of a plurality of targets moving at a high speed. When there is no predicted angle of arrival, the range of the angle of arrival is defined from −90° to 90°. Further, a range of a moving speed of the target, that is, a range of the angular velocity is set, in which the moving speed of the target is defined as degree/second or degree/sample. Further, the resolving power of the angle of arrival and the angular velocity is defined.

In the setting of the minimum value (S1200), the minimum values of the ranges defined in the defining (S1100), that is, the range of the angle of arrival and the range of the angular velocity are set.

In accordance with the first embodiment of the present invention, the estimating (S1300) includes transforming an incident signal (S1310), calculating covariance (S1320), deriving spectrum (S1330), determining a maximum value (S1340), a detecting a peak value (S1350), and calculating a measurement value (S1360) and the angle of arrival resolution and the angular velocity resolution may be defined prior to the defining (S1100), in which in accordance with the first embodiment of the present invention, the angle of arrival resolution for the set angle of arrival is 0.1 and the angular velocity resolution for the set angular velocity is 1.

In the transforming of the incident signal (S1310), pre-steered vectors of the set angle of arrival and the set angular velocity are calculated and the incident signal is transformed using the pre-steered vector.

Figure 3:
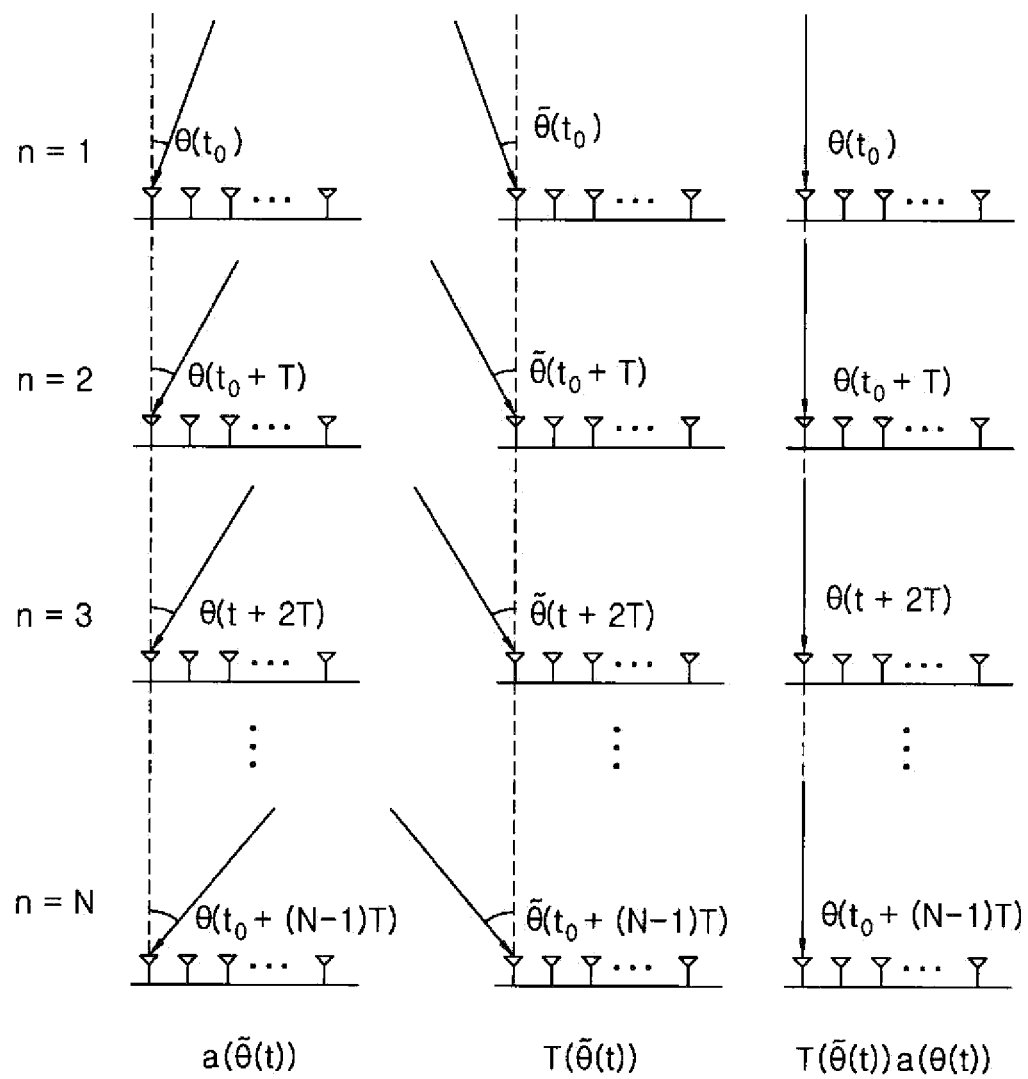
FIG. 3 is a conceptual diagram of incident signal transformation using a pre-steered vector.

The pre-steered vector is a matrix which transforms steered vectors for each sample defined by the set angle of arrival and the set angular velocity into a steered vector of a signal incident at 0°. When the steered vector is applied to all the samples, the corresponding angle of arrival and the incident signal of the angular velocity are transformed into a time-invariant angle of arrival and an incident signal of 0° (see FIG. 3).

However, values other than the set angle of arrival and the set angular velocity are transformed into a signal of a time-invariant angle of arrival parameter.

In the calculating of the covariance (S1320), the sample covariance matrix is calculated from the transformed incident signal.

In the deriving of the spectrum (S1330), a two-dimensional spectrum is derived by calculating a multiple signal classification (MUSIC: high-resolution subspace direction finding method) power spectrum for the set angle of arrival and the set angular velocity.

In this case, the covariance matrix calculated from the transformed incident signal is eigen-decomposed and then calculated and MUSIC similar power is calculated using a noise subspace eigen vector and the steered vector of the signal incident from 0°.

In the determining of the maximum value (S1340), it is determined whether the set angle of arrival and the set angular velocity are a maximum value within the range.

If it is determined that the set angle of arrival and the set angular velocity are not the maximum value within the range, the angle of arrival resolution and the angular velocity resolution are added to the set angle of arrival and the set angular velocity and then the transforming of the incident signal (S1310) is re-performed.

That is, the estimating (S1300) is repeatedly performed within the range from a minimum value to a maximum value of the set angle of arrival and the set angular velocity.

When both of the set angle of arrival and the set angular velocity are the maximum value within the range, the detecting of the peak value (S1350) is performed and in the detecting of the peak value (S1350), the peak value of the two-dimensional spectrum is detected.

In the calculating of the measurement value (S1360), the angle of arrival and the angular velocity of the peak value are calculated as the measured angle of arrival and the measured angular velocity.

The method for estimating an angle of arrival of multiple targets moving at a high speed according to the first embodiment of the present invention configured as described above calculates the sample covariance matrix for all of the angles of arrival and the angular velocity parameters within two dimension and derives the noise subspace eigen vector using the eigen decomposition from the calculated matrix and therefore has large calculation.

As compared with the first embodiment of the present invention using the pre-steered vector, a second embodiment of the present invention which is a method for estimating an angle of arrival using a subspace by a virtual array rotation having less calculation is as follows.

In the case of the first embodiment of the present invention, only one position of the two-dimensional spectrum may be obtained by one sample covariance matrix.

Therefore, as described above, to obtain the two-dimensional spectrum, the sample covariance matrix for all the possible angles of arrival and angular velocities needs to be determined and the algorithm needs to be applied and therefore the calculation may be increased.

Figure 4:
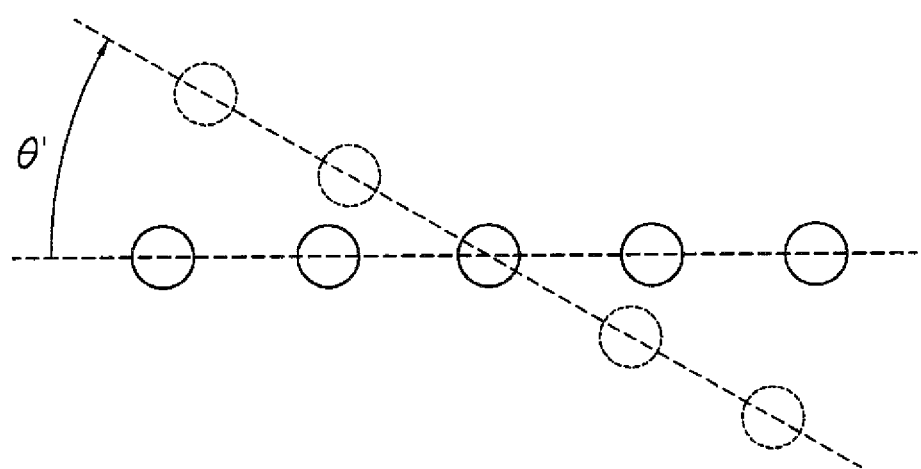
FIG. 4 is a conceptual diagram of the incident signal transformation using a virtual array rotation.

According to the second embodiment of the present invention, as illustrated in FIG. 4, to reduce a burden of the calculation, the moving target having the same angular velocity seems like being stationary by virtually rotating a linear array at the given angular velocity.

In this case, all the angles of arrival at the given angular velocity are linearly transformed into the fixed angle of arrival. Therefore, the spectrum of the angles of arrival within the angular velocity given by only one-time transformation.

Figure 2A:
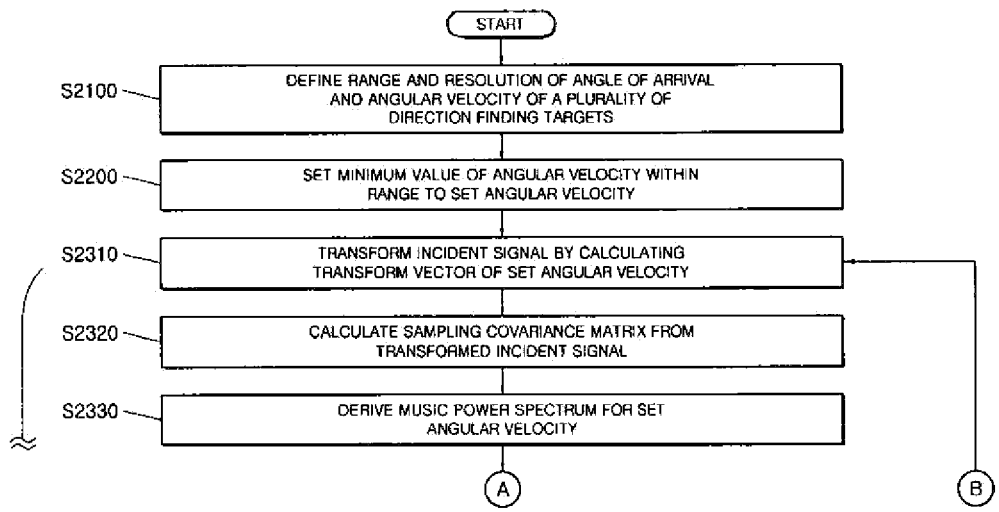
FIGS. 2A and 2B are flow charts of a method for estimating an angle of arrival of multiple targets moving at a high speed in accordance with a second embodiment of the present invention.
Figure 2B:
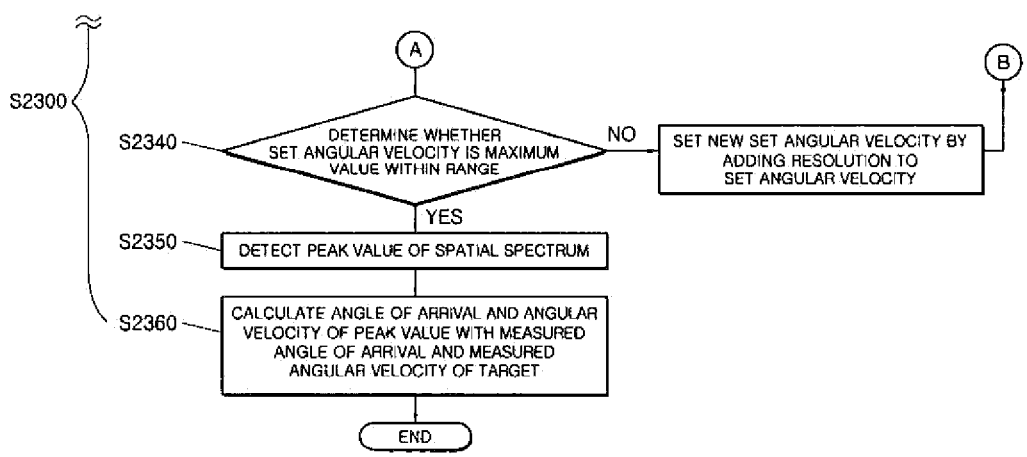

FIGS. 2A and 2B are flow charts of the method for estimating an angle of arrival of multiple targets moving at a high speed in accordance with the second embodiment of the present invention.

As illustrated in FIGS. 2A and 2B, the method for estimating an angle of arrival of multiple targets moving at a high speed in accordance with the second embodiment of the present invention includes: defining a range and a resolving power of an angle of arrival and an angular velocity of a plurality of direction finding targets (S2100); setting minimum values of the angular velocity within the range to be a set angular velocity (S2200); and adding the angular velocity resolution to the set angular velocity, respectively, deriving a two-dimensional spectrum of a transformed incident signal transformed using a transform vector until the angular velocity become a maximum value, and estimating a peak value of the two-dimensional spectrum as a measured angle of arrival and a measured angular velocity of the target (S2300).

According to the second embodiment of the present invention, in the defining (S2100), the range of the angle of arrival to be found is set from predicted angles of arrival of a plurality of targets moving at a high speed. When there is no predicted angle of arrival, the range of the angle of arrival is defined from −90° to 90°. Further, a range of a moving speed of the target, that is, a range of the angular velocity is set, in which the moving speed of the target is defined as degree/second or degree/sample. Further, the resolving power of the angle, of arrival and the angular velocity is defined.

According to the second embodiment of the present invention, in the setting of the minimum value (S2200), the minimum value of the range defined in the defining (S2100), that is, the range of the angular velocity is set.

In the second embodiment of the present invention, the estimating (S2300) includes transforming the incident signal (S2310), calculating a covariance (S2320), deriving spectrum (S2330), determining a maximum value (S2340), detecting a peak value (S2350), and calculating a measurement value (S2360) and in the second embodiment of the present invention, the angular velocity resolution for the set angular velocity is 1.

According to the second embodiment of the present invention, in the transforming of the incident signal (S2310), a transform vector of the set angular velocity is calculated and the incident signal is transformed using the transform vector.

The transform vector is a matrix which transforms a steered vector so that all the incident angles of arrival for the set angular velocity are stationary regardless of a sample.

The transform vector is calculated based on the set angular velocity and obtained based on a least square method and the transform vectors for each sample are obtained and thus applied, such that all the angles of arrival at the corresponding angular velocity, that is, the set angular velocity are transformed to form the same time-invariant angle of arrival, that is, a virtual array (see FIG. 4).

According to the second embodiment of the present invention, the sample covariance matrix is calculated from the incident signal transformed in the calculating of the covariance (S2320).

According to the second embodiment of the present invention, in the deriving of the spectrum (S2330), a two-dimensional spectrum is derived by calculating a multiple signal classification (MUSIC: high-resolution subspace direction finding method) power spectrum for the set angle of arrival and the set angular velocity.

Further, prior to calculating the power spectrum, the covariance matrix calculated from the transformed incident signal is eigen-decomposed and then calculated and MUSIC similar power is calculated based on a noise subspace eigen vector and the steered vector of the signal incident from 0°.

According to the second embodiment of the present invention, in the determining of the maximum value (S2340), the two-dimensional spectrum is derived and then it is determined whether the set angular velocity is a maximum value within the range.

If it is determined that the set angular velocity is the maximum value within the range, the detecting of the peak value (S2350) which detects the peak value of the two-dimensional spectrum is performed.

After the detecting of the peak value (S2350), the calculating of the measurement value (S2360) which the angle of arrival and the angular velocity of the peak value are calculated as the measured angle of arrival and the measured angular velocity.

Figure 5:
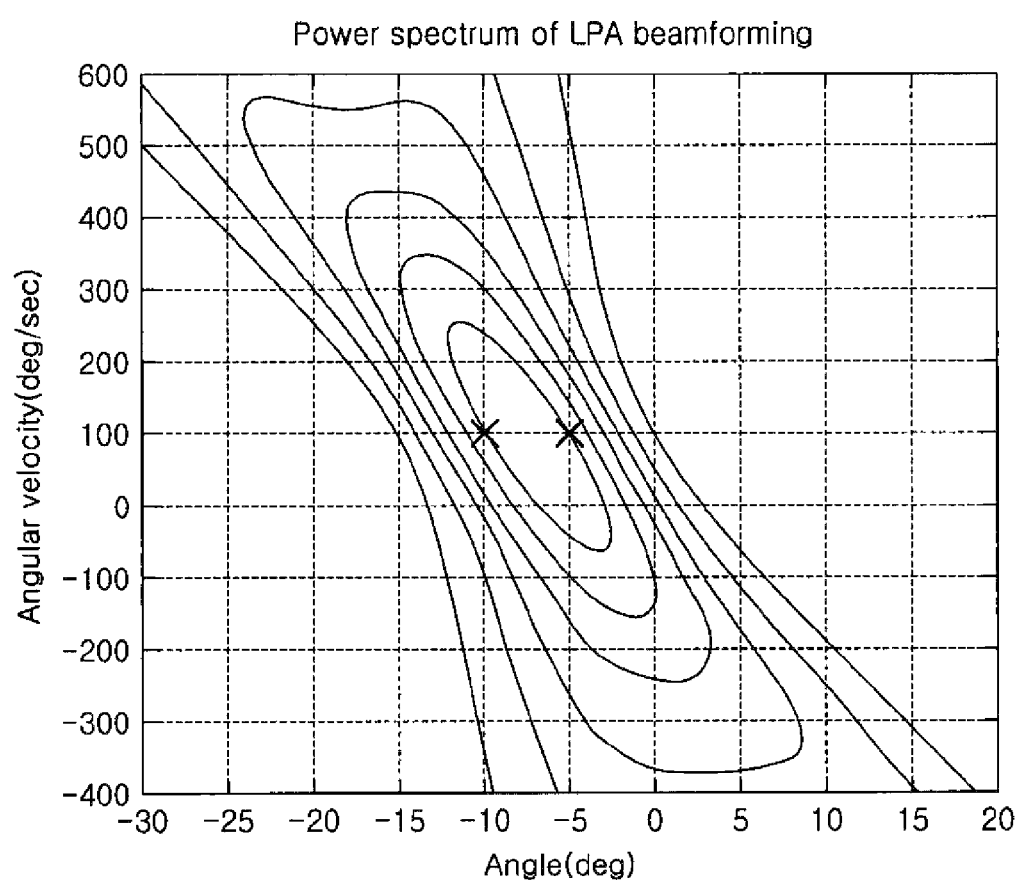
FIG. 5 is a diagram illustrating spectrum derived by a conventional method for estimating an angle of arrival using a local polynomial approximation.
Figure 6:
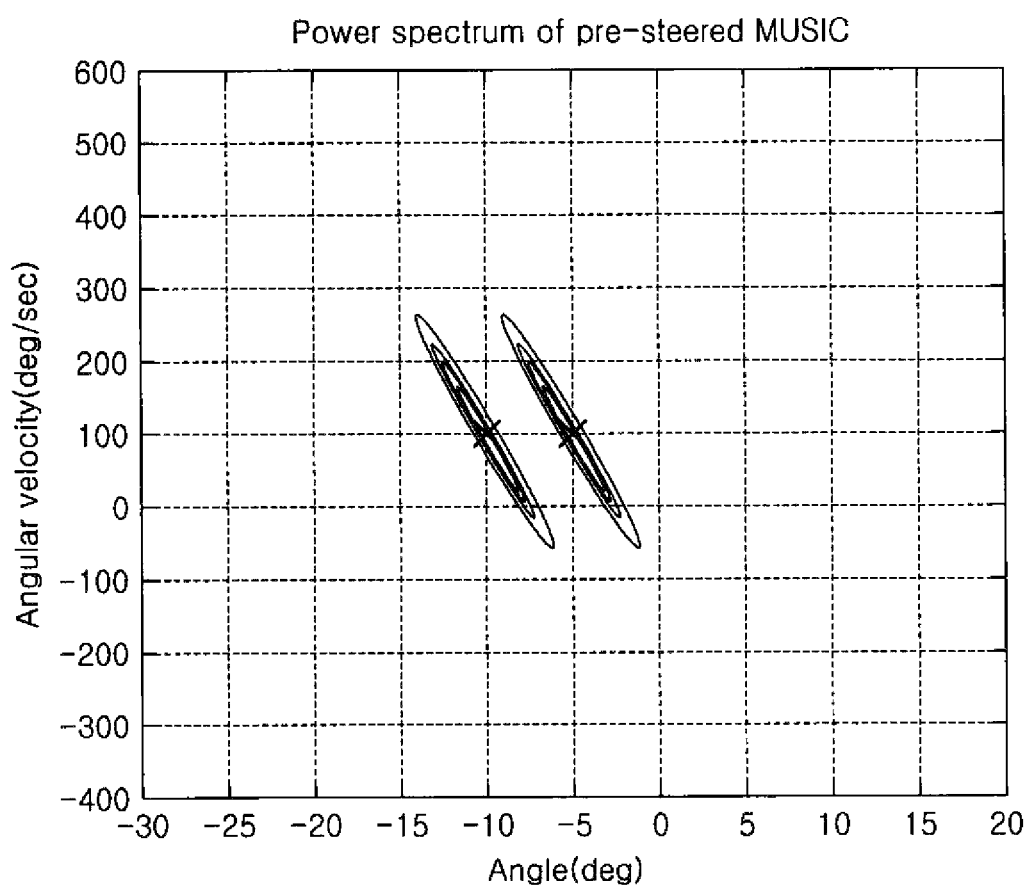
FIG. 6 is a diagram illustrating spectrum derived in accordance with the first embodiment of the present invention.
Figure 7:
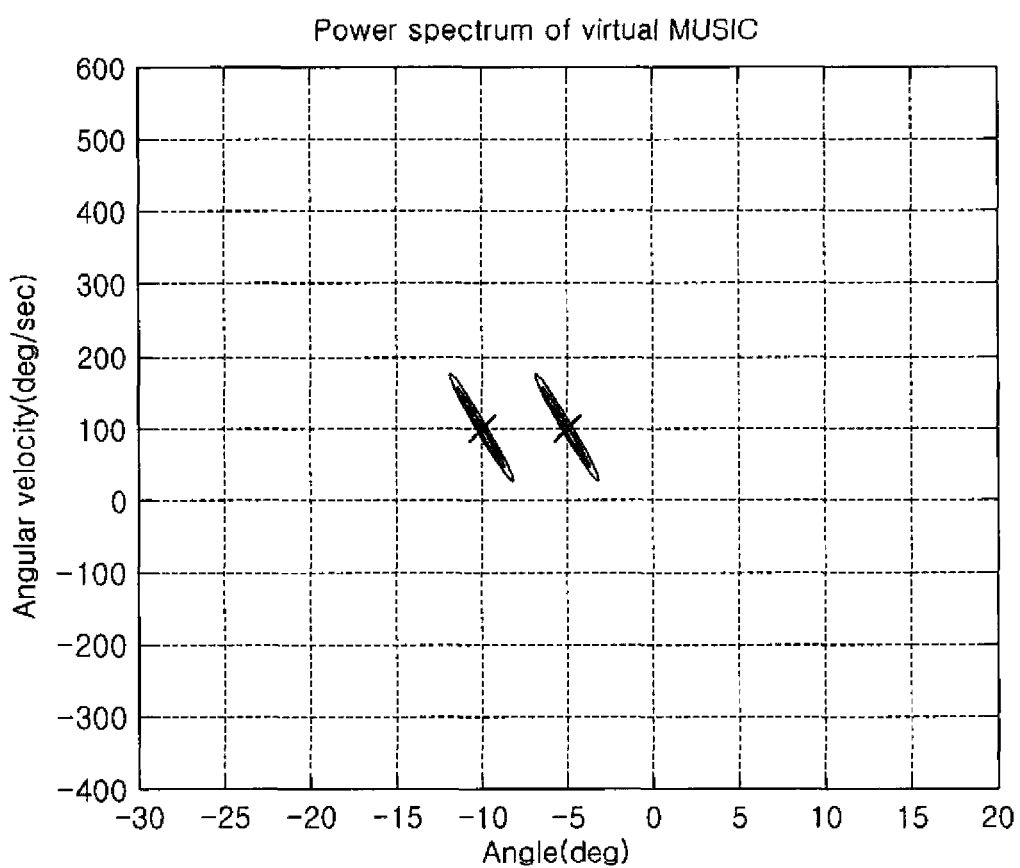
FIG. 7 is a diagram illustrating spectrum derived in accordance with the second embodiment of the present invention.

FIG. 5 is a diagram illustrating spectrum derived by a conventional method for estimating an angle of arrival based on a local polynomial approximation, FIG. 6 is a diagram illustrating spectrum derived in accordance with the first embodiment of the present invention, and FIG. 7 is a diagram illustrating spectrum derived in accordance with the second embodiment of the present invention.

FIG. 5 illustrates the two-dimensional power spectrum in which two targets moving at the angular velocity of 100°/sec at the angle of arrival of −10° and −5° are estimated by the method for estimating an angle of arrival based on the local polynomial approximation.

A position of the actual target is represented by 'X' in a contour graph. However, the peak values of the contour graph are estimated as the angle of arrival of −7.5°/sec and the angular velocity of 100°/sec which are an intermediate position of the actual target.

FIG. 6 illustrates the two-dimensional power spectrum estimated according to the first embodiment of the present invention using the pre-steered vector under the same condition at the condition in FIG. 5.

It may be appreciated that the peak values of the contour graph of the spectrum estimated according to the first embodiment of the present invention are similar to the angle of arrival and the angular velocity of the actual target.

FIG. 7 illustrates the two-dimensional power spectrum estimated according to the second embodiment of the present invention using the virtual array rotation under the same condition as the condition in FIG. 5.

It may be appreciated that the peak values of the contour graph of the spectrum estimated according to the second embodiment of the present invention are also similar to the angle of arrival and the angular velocity of the actual target.

Figure 8:
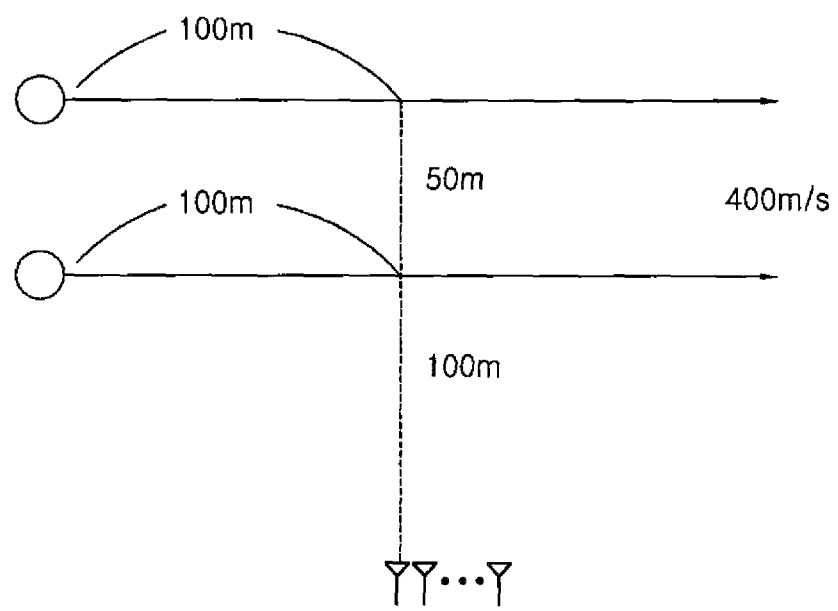
FIG. 8 is an exemplified diagram of experimental environment.
Figure 9:
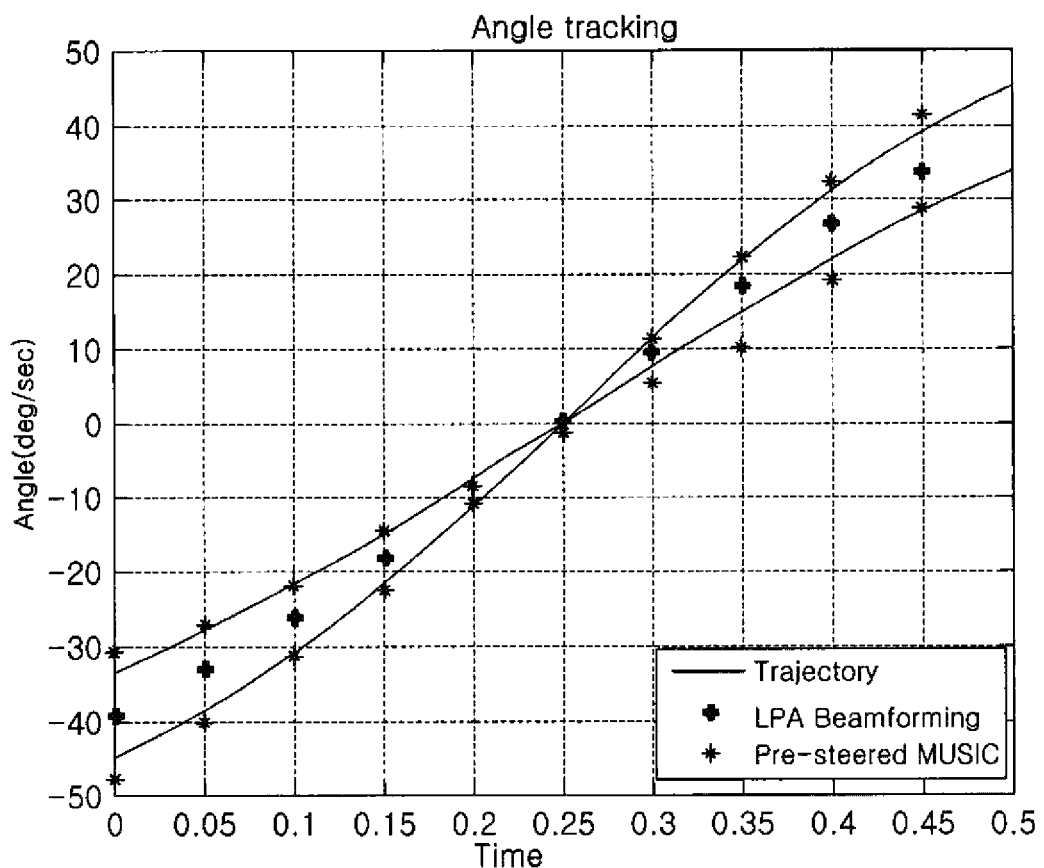
FIG. 9 is a diagram illustrating a trajectory derived in accordance with the conventional method for estimating, an angle of arrival using the local polynomial approximation in the experimental environment of FIG. 8 and the first embodiment of the present invention.
Figure 10:
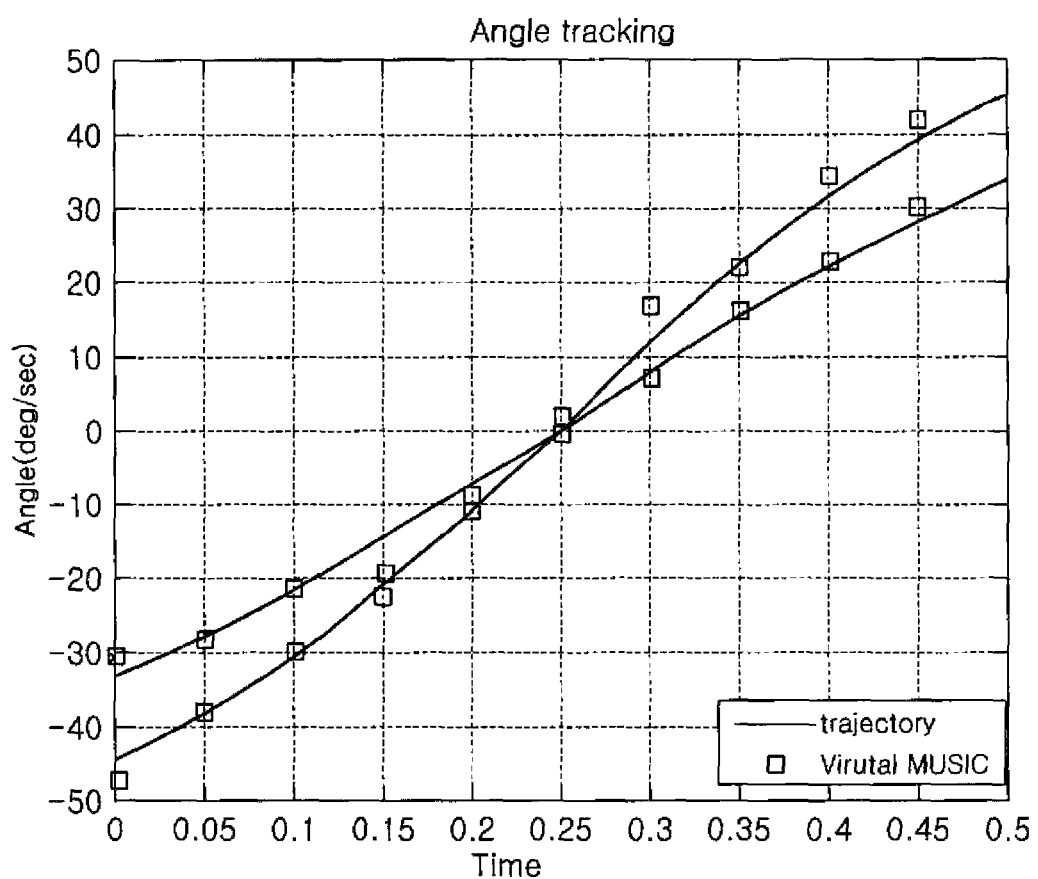
FIG. 10 is a trajectory derived in accordance with the second embodiment of the present invention in the experimental environment of FIG. 8.

FIG. 8 is an, exemplified diagram of experimental environment, FIG. 9 is a diagram illustrating a trajectory derived in accordance with the conventional method for estimating an angle of arrival based on the local polynomial approximation in the experimental environment of FIG. 8 and the first embodiment of the present invention, and FIG. 10 is a trajectory derived in accordance with the second embodiment of the present invention in the experimental environment of FIG. 8.

The experimental environment illustrated in FIG. 8 is based on the assumption that the two targets fly at the same speed.

When it is assumed that a signal of the two targets radiating electromagnetic waves of 3 GHz band is acquired in eight half-wavelength equi-distance linear arrays, a fresnel distance is 9.8 m. Therefore, it may be assumed in the experimental environment of FIG. 8 that the target is positioned at a far field and thus there is no effect of the incident angle of arrival with respect to the distance.

FIG. 9 illustrates that in the experimental environment of FIG. 8, the trajectory estimated using the conventional local polynomial approximation beamforming method is represented by '+' and the trajectory estimated according to the first embodiment of the present invention using the pre-steered vector is represented by '*'.

It may be appreciated that the trajectory tracked using the conventional local polynomial approximation beamforming method is estimated as one target and it may be confirmed that the trajectory estimated according to the first embodiment of the present invention using, the pre-steered vector is similar to an actual trajectory represented by a solid line and the two targets may be separated from each other.

FIG. 10 illustrates that in the experimental environment of FIG. 8, the trajectory tracked according to the second embodiment of the present invention using the array rotation is represented by '□'.

It may be appreciated that the trajectory tracked according to the second embodiment of the present invention using the array rotation is also similar to the actual trajectory represented by a solid line and, the two targets may be separated from each other.

In accordance with the embodiments of the present invention, the method for estimating an angle of arrival of multiple targets moving at a high speed may improve the resolving power capable of differentiating the multi-target by implementing the two-dimensional spectrum, having the higher resolution than that of the conventional direction finding method using the local polynomial approximation.

Further, in accordance with the embodiments of the present invention, the method for estimating an angle of arrival of multiple targets moving at a high speed may be widely applied to a defense sector such as a phased array radar and a sonar which finds the directions of the moving targets using the array sensors and a private sector such as multi-antenna communications, geology, medicine, and astronomy.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention, is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A method for estimating an angle of arrival of multiple targets moving at a high speed, the method comprising:

defining, by an angle of arrival and angular velocity defining unit, a resolving power and a range of an angle of arrival and an angular velocity of a plurality of direction finding targets (S1100);

setting, by an angle of arrival and angular velocity setting unit, minimum values of the angle of arrival and the angular velocity within the defined range of the angle of arrival and the angular velocity to be a set angle of arrival and a set angular velocity (S1200); and adding, by an angle of arrival and angular velocity estimating unit, a value of angle of arrival resolution and a value of angular velocity resolution to the set angle of arrival and the set angular velocity, respectively, deriving a two-dimensional spectrum of a transformed incident signal using a pre-steered vector until the angle of arrival and the angular velocity become a maximum value, and estimating a peak value of the two-dimensional spectrum as a measured angle of arrival and a measured angular velocity of the target (S1300), wherein in the estimating (S1300), the pre-steered vector is calculated using the set angle of arrival and the set angular velocity, and wherein the angle of arrival and angular velocity defining unit, the angle of arrival and angular velocity setting unit, and the angle of arrival and angular velocity estimating unit comprise executable code configured and executed by a processor using algorithm associated with a non-transitory storage device.

2. The method of claim 1, wherein the pre-steered vector is a matrix which transforms steered vectors for each sample defined by the set angle of arrival and the set angular velocity into a steered vector of a signal incident at 0°.

3. The method of claim 1, wherein a sample covariance matrix is calculated from the incident signal.

4. The method of claim 1, wherein in the estimating (S1300), the two-dimensional spectrum is derived by calculating a multiple signal classification (MUSIC: high-resolution subspace direction finding method) power spectrum for the set angle of arrival and the set angular velocity.

5. The method of claim 4, wherein prior to calculating the multiple signal classification (MUSIC: high-resolution subspace direction finding method) power spectrum for the set angle of arrival and the set angular velocity, a covariance matrix calculated from the transformed incident signal is eigen-decomposed.

6. The method of claim 4, wherein after the two-dimensional spectrum is derived in the estimating (S1300), the determining of the maximum value (S1340) determining whether the set angle of arrival and the set angular velocity are the maximum value within the range is performed.

7. The method of claim 6, wherein if it is determined that both of the set angle of arrival and the set angular velocity are the maximum value within the range, detecting a peak value of the two-dimensional spectrum (S1350) is performed.

8. A method for estimating an angle of arrival of multiple targets moving at a high speed, the method comprising:

defining, by an angle of arrival and angular velocity defining unit, a resolving, power and a range of an angle of arrival and an angular velocity of a plurality of direction finding targets (S2100);

setting by an angular velocity setting unit, minimum values of the angular velocity within the defined range of the angular velocity to be the set angular velocity (S2200); and adding, by an angle of arrival and angular velocity estimating unit, a value of the angular velocity resolution to the set angular velocity, deriving a two-dimensional spectrum of a transformed incident signal transformed using a transform vector until the angular velocity become a maximum value, and estimating a peak value of the two-dimensional spectrum as a measured angle of arrival and a measured angular velocity of the target (S2300), wherein in the estimating (S2300), the transform vector is calculated using the set angle of arrival and the set angular velocity, and wherein the angle of arrival and angular velocity defining unit, the angular velocity setting unit, and the angle of arrival and angular velocity estimating unit comprise executable code configured and executed by a processor using algorithm associated with a non-transitory storage device.

9. The method of claim 8, wherein the transform vector is a matrix which transforms a steered vector so that all the angles of arrival for the set angular velocity are stationary regardless of a sample.

10. The method of claim 8, wherein in the estimating (S2300), a sample covariance matrix is calculated from the incident signal.

11. The method of claim 8, wherein in the estimating (S2300), the two-dimensional spectrum is derived by calculating a multiple signal classification (MUSIC: high-resolution subspace direction finding method) power spectrum for the set angle of arrival and the set angular velocity.

12. The method of claim 11, wherein prior to calculating the multiple signal classification (MUSIC: high-resolution subspace direction finding method) power spectrum for the set angle of arrival and the set angular velocity, a covariance matrix calculated from the transformed incident signal is eigen-decomposed.

13. The method of claim 11, wherein after the two dimensional spectrum is derived in the estimating (S2300), the determining of the maximum value (S2340) determining whether the set angular velocity is the maximum value within the range is performed.

14. The method of claim 13, wherein if it is determined that the set angular velocity is the maximum value within the range, detecting a peak value of the two-dimensional spectrum (S2350) is performed.

* * * * *